Aug. 12, 1941.                    J. A. BYRONE                         2,252,250
                                 POURING SPOUT
                              Filed Dec. 13, 1939              2 Sheets-Sheet 1
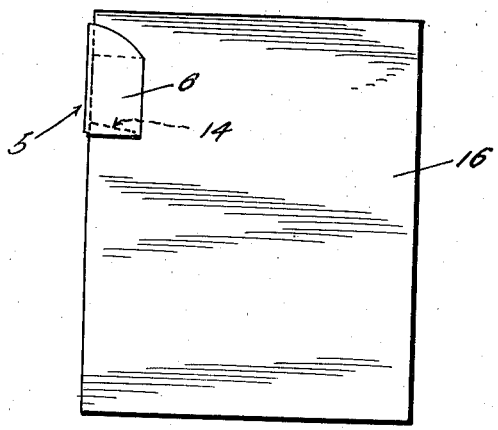
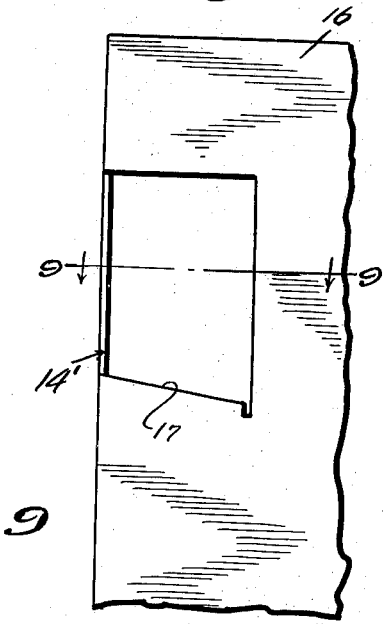
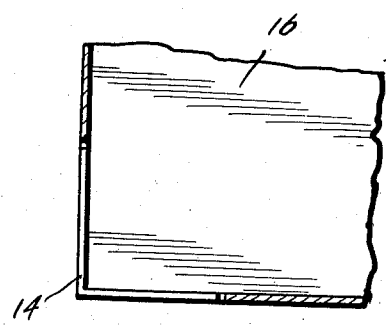
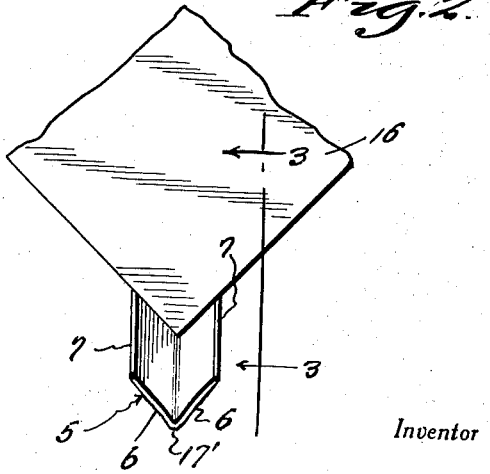
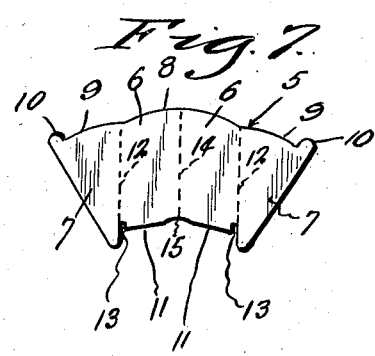
Inventor
John A. Byrone
By Clarence A. O'Brien
and Hyman Berman
Attorneys Aug. 12, 1941.  J. A. BYRONE  2,252,250
POURING SPOUT
Filed Dec. 13, 1939   2 Sheets-Sheet 2

Inventor

John A. Byrone

By Clarence A. O'Brien
and Hyman Berman
Attorneys

Patented Aug. 12, 1941

2,252,250

UNITED STATES PATENT OFFICE 2,252,250

POURING SPOUT

John A. Byrone, Chicago, Ill.

Application December 13, 1939, Serial No. 309,098

1 Claim. (Cl. 221—11)

This invention relates broadly to containers and more particularly to a spout for use in connection therewith to facilitate the pouring of the contents of said containers. Also, in the contemplation of the present invention the spout will be found to be useful in facilitating the filling of the container with which it is used.

A primary object of the present invention is to provide a spout of this character that is particularly designed for application to a container of square, rectangular, or other polygonal shape, equipped at a corner or angle between two sides of such container, for receiving the spout.

A further object of the invention is to provide a spout of this character characterized by simplicity of construction.

A further object of the invention is to provide a spout of this character which may be readily applied to the selected container and without requiring a great deal of skill on the part of the person so applying it.

The invention together with its objects and advantages will be best understood from a study of the following description taken in connection with the accompanying drawings wherein—

Figure 1 is a side elevational view of a container having my improved spout associated therewith, and with the spout shown in fully closed position.

Figure 2 is a fragmentary top plan view of the container with the spout shown in open position.

Figure 7 is a plan view of the spout in a flattened out condition.

Figure 8 is a fragmentary side elevational view of the container equipped for receiving the spout, and with the spout removed.

Figure 9 is a detail sectional view taken substantially on the line 9—9 of Figure 8.

Figure 3:
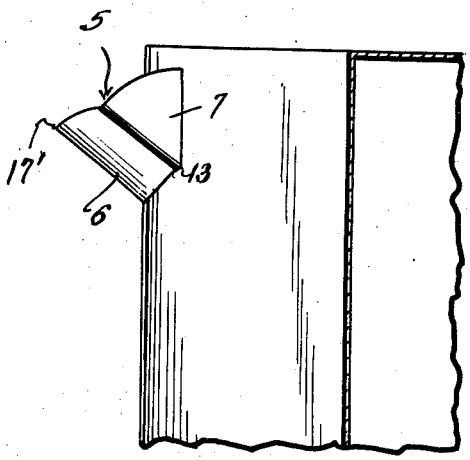
Figure 3 is a fragmentary detail view partly in section, and partly in elevation, and taken substantially on the line 3—3 of Figure 2.
Figure 5:
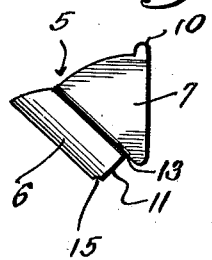
Figure 5 is a side elevational view of the spout.

Referring more in detail to the drawings it will be seen that in the preferred embodiment thereof the spout, indicated generally by the reference numeral 5, is formed from a single blank of metal, or other somewhat ductile material, cut, shaped and dimensioned to provide a substantially V-shaped body having sides 6—6, with the sides merging into substantially triangular-shaped wings 7—7.

The blank, when spread out, as shown in Figure 7, is of somewhat segmental shape and the edge of the blank at the convex edge thereof is scalloped, providing a convex edge 8 common to the sides 6 of the spout and convex edges 9 for the wings 7.

At the edges 9 the wings 7 have the free corners thereof extended to provide stops or abutments 10.

At the substantially concave edge of the segmental-shaped blank, a portion of said blank is removed so that the edges 11 of the sides 6 terminate short of the apices of the wings 7. At the edges 11 the sides 6 of the spout at the fold lines 12 are notched as at 13 to accommodate the wall of the container at the lower edge of the opening 14 provided in the wall of the container.

The blank at the edges 11 of the sides 6 of the spout is provided with an arcuate notch 15. This notch and the edges 11 engage portions of the corner of the carton, when the spout is open, as shown in Figure 3.

Figure 6:
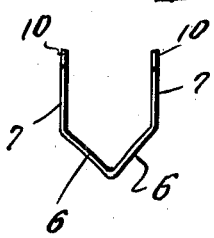
Figure 6 is a plan view of the spout.

In shaping the spout the blank is first folded on the line 14 so as to provide a substantially V-shaped body for the spout, and then folded on the fold lines 12 to the angular position with respect to the sides 6 of the spout as suggested in Figure 6 so that the parts 7 of the blank form extension wings for the sides 6 of the spout.

To accommodate the spout the selected container 16, which may be of square, rectangular, or other shape, has adjacent walls thereof at a corner or angle formed by said walls cut out to provide an opening 14' bisected by said corner.

When properly mounted on the container those portions of the lower edge of the opening 14' adjacent the side walls of the opening are accommodated in the notches 13 of the spout and the spout fulcrums on these portions of the lower edge of the opening at the notches 13, and the abutments 10 are disposed internally of the container so as to abut the walls of the container when the spout is swung outwardly to the open position shown, for example, in Figures 2 and 3, to limit this outward swinging movement of the spout.

In order that the spout will conformably fit the opening 14' the lower edge of the opening at each of the side walls is inclined as at 17, so that the vertical length of the opening is materially less at the corner than at the inner vertical edges of the opening.

Figure 4:
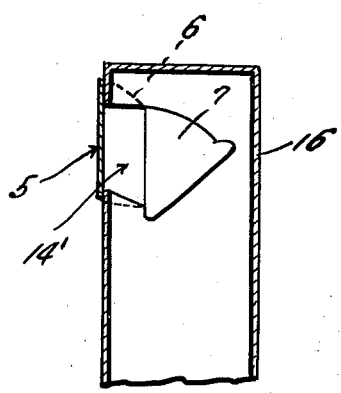
Figure 4 is a fragmentary detail sectional view through the container and spout with the spout shown in a fully closed position.

When the spout is in the closed position shown in Figure 1, the sides 6 of the spout will overlap and fit against the side walls of the container, the upper edges, or edges 8 of the sides 6 abutting said walls as clearly shown in Figure 4.

It will also be noted, reference being had to Figure 4, that when in closed position the spout overlaps the walls of the container above and below the edges of the opening 14' thus providing for greater frictional engagement of the spout with the walls of the container to the end that the spout is held firm in either open or closed position, thus preventing the contents of the container from sifting through the opening and around the spout.

Also by reason of the point, or substantial point 17', formed by the angular relation of the sides 6 of the spout, at the pouring end of the spout, easy opening of the spout from either the right or left side may be effected.

It is thought that a clear understanding of the construction, utility, manner of use and advantages of a pouring spout embodying the features of the present invention will be had without a more detailed description thereof.

Having thus described the invention what is claimed as new is:

In combination with a container having an opening in a wall thereof, a pouring spout comprising a front portion and a pair of side wings, the lower edge of the front portion at its junction with the wings having upwardly extending notches therein for receiving those portions of the lower wall of the opening in the container which are adjacent the side walls of said opening, with the spout rocking on these portions at the notches, the lower edge of the front portion slightly diverging downwardly from its center to the notches, the upper edges of the wings being bowed upwardly to contact portions of the top wall of the opening in all positions of the spout and said wings having upwardly extending projections thereon at the outer ends of said upper walls for limiting outward movement of the spout and said wings having their lower ends extending below the lower edge of the front part, the lower edge and the top edge of the front portion of the spout overlapping parts of the container below and above the opening when the spout is closed, said front of the spout being of substantially V-shape in cross section and having an upwardly bowed notch in the center of its lower edge and the opening in the container being made in a corner thereof with one part of the opening in one side of the container and another part in an adjacent side with the upwardly bowed notch receiving a portion of the corner of the container when the spout is in open position.

JOHN A. BYRONE.